M. W. LAWLOR.
POULTRY FEEDER.
APPLICATION FILED AUG. 20, 1913.
1,114,892.
Patented Oct. 27, 1914.
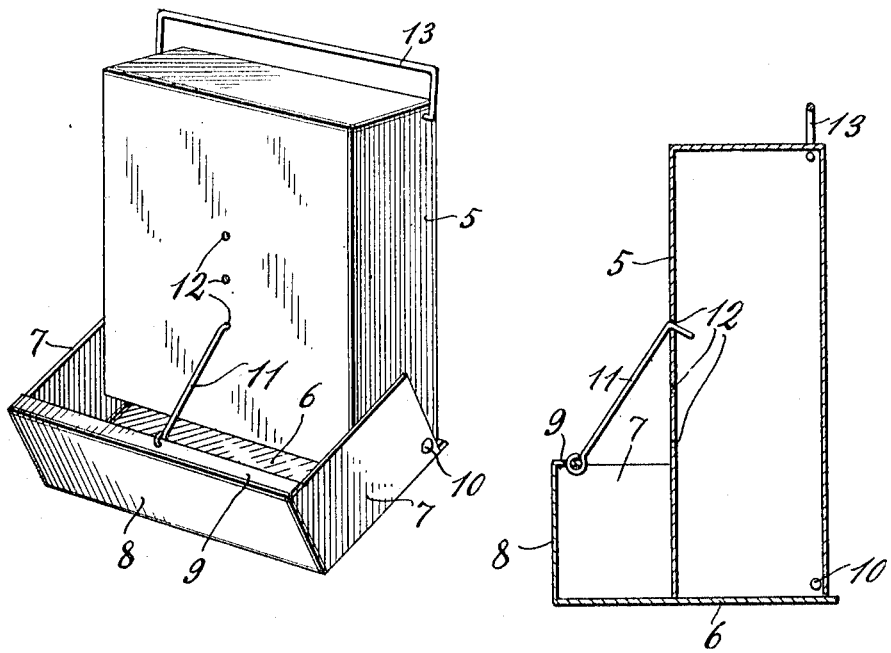
Fig. 1.
Fig. 2.
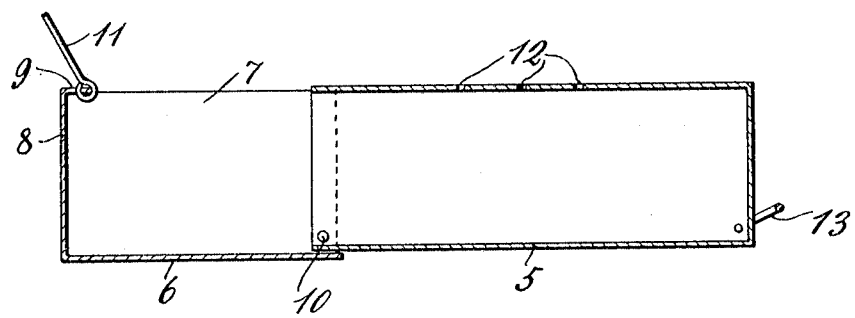
Fig. 3.
WITNESSES:
INVENTOR
Michael Wm. Lawlor.
BY
ATTORNEY

UNITED STATES PATENT OFFICE.

MICHAEL WILLIAM LAWLOR, OF NEEDHAM HEIGHTS, MASSACHUSETTS, ASSIGNOR OF ONE-HALF TO IDEAL CAN COMPANY, INCORPORATED, OF BOSTON, MASSACHUSETTS.

POULTRY-FEEDER.

1,114,892.  Specification of Letters Patent.  Patented Oct. 27, 1914.

Application filed August 20, 1913. Serial No. 785,719.

*To all whom it may concern:*

Be it known that I, MICHAEL WM. LAWLOR, a citizen of the United States, residing at Needham Heights, in the county of Norfolk and State of Massachusetts, have invented certain new and useful Improvements in Poultry-Feeders, of which the following is a specification.

The feed device which is the subject matter of the present application for patent is designed for feeding dry mash, grains, oyster shells, charcoal, grit, etc., in any desired quantity, and it is so constructed that it may be entirely closed up when not in use, thus rendering it rat or mouse proof. These objects are attained by means of a novel combination and arrangement of parts to be hereinafter described and claimed, reference being had to the accompanying drawing, in which—

Figure 1 is a perspective view of the device. Fig. 2 is a vertical section of the device showing the same closed. Fig. 3 is a vertical section of the device opened up for receiving the feed.

Referring specifically to the drawing the feeder comprises a receptacle 5 which is closed at the top and open at the bottom, and carries a trough located beneath said open bottom. The trough comprises a bottom 6, side walls 7, and a front wall 8, the latter having a short inturned top edge 9. The side walls fit close against the side walls of the receptacle 5 and are pivoted thereto, as indicated at 10. Thus, the trough may be swung down to extend at an inclination with respect to the open bottom of the receptacle, with its bottom spaced from the latter, and it is held in this position by a hook 11 carried by the part 9 and adapted to be inserted into a hole 12 in the front wall of the receptacle. By providing a vertical series of holes, the trough may be held at various angles. The trough is also adapted to be swung into horizontal position, in which position its bottom 6 engages the open bottom of the receptacle and forms a closure therefor, thus preventing rats, mice, etc., from getting to the contents of the receptacle. The hook 11 also serves to hold the trough in this position. The receptacle is provided with a bail 13 so that it may be hung up in position for use.

A feed device constructed as herein described is devoid of complicated parts, and it can therefore be easily and cheaply manufactured, sheet metal being employed in its construction. When the trough is in inclined position, the grain, etc., drops down thereinto by gravity, and the feed can be regulated by adjusting the angle of the trough as hereinbefore described, so that it is impossible for the grain to clog. The receptacle is filled by swinging the trough so that it extends in alinement with the receptacle, as shown in Fig. 3 which leaves the bottom of the receptacle entirely uncovered.

I claim:

1. A feed device comprising a receptacle having an open bottom, and a trough pivoted to the receptacle, the width of the trough being greater than that of the receptacle, the bottom of the trough being located beneath the open bottom of the receptacle, and means for holding the trough with its bottom against the open bottom of the receptacle to form a closure for the latter.

2. A feed device comprising a receptacle having an open bottom, and a trough pivoted to the receptacle and having its bottom located beneath the open bottom of the receptacle, said trough being adjustable to extend at an inclination beneath the bottom of the receptacle with the trough bottom spaced from the receptacle bottom, and also adjustable to place its bottom against the receptacle bottom and form a closure therefor.

In testimony whereof I affix my signature in presence of two witnesses.

MICHAEL WILLIAM LAWLOR.

Witnesses:
ELMER C. RICHARDSON,
CHARLES A. FAYHLS.

Copies of this patent may be obtained for five cents each, by addressing the "Commissioner of Patents, Washington, D. C."